(12) United States Patent
Schwenke et al.

(10) Patent No.: US 7,672,524 B2
(45) Date of Patent: Mar. 2, 2010

(54) QUALITY CONTROL FOR IMAGE TRANSCODING

(75) Inventors: Derek L. Schwenke, Marlborough, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1015 days.

(21) Appl. No.: 11/367,055

(22) Filed: Mar. 2, 2006

(65) Prior Publication Data

US 2007/0206873 A1    Sep. 6, 2007

(51) Int. Cl.
*G06K 9/36* (2006.01)
(52) U.S. Cl. .................................. 382/239; 382/243
(58) Field of Classification Search .................. 382/239, 382/243
See application file for complete search history.

(56) References Cited

U.S. PATENT DOCUMENTS

| 7,206,804 | B1 * | 4/2007 | Deshpande et al. | 709/203 |
| 2003/0085902 | A1 * | 5/2003 | Vogelaar et al. | 345/505 |
| 2007/0025441 | A1 * | 2/2007 | Ugur et al. | 375/240.03 |

OTHER PUBLICATIONS

Skodras et al., "The JPEG 2000 still image compression standard," IEEE Signal Processing Magazine, Sep. 2001.

Wang et al., "Bitplane-by-bitplane shift (BbBShift)—A suggestion for JPEG 2000 Region of Interest image coding," IEEE Signal Processing Letters, vol. 9, No. 5, May 2002.

Liu et al., "A new JPEG 2000 region-of-interest image coding method: partial significant bitplanes shift," IEEE Signal Processing Letters, vol. 10, No. 2, Feb. 2003.

Rosenbaum et al., "Flexible, dynamic and compliant region of interest coding in JPEG 2000," IEEE Proceeding of ICIP, Rochester, New York, Sep. 2002.

* cited by examiner

*Primary Examiner*—Vikkram Bali
*Assistant Examiner*—Eueng-Nan Yeh
(74) *Attorney, Agent, or Firm*—Dirk Brinkman; Gene Vinokur

(57) ABSTRACT

A method and apparatus transcode an image. An encoded input bitstream of the image is analyzed to obtain a structure of the encoded input bitstream, in which the image includes a region-of-interest and a background region, and in which the encoded input bitstream is a stream of packets. A first quality value for the region-of-interest and a second quality value for the background region are determined. An encoded output bitstream is composed from a subset of the packets selected from the encoded input bitstream according to the structure, in which the subset of packets includes a first set of packets corresponding to the region-of-interest having the first quality value, a second set of packets corresponding to the background region and having second quality value, and empty packets.

11 Claims, 5 Drawing Sheets

QUALITY CONTROL FOR IMAGE TRANSCODING

FIELD OF THE INVENTION

The invention relates generally to image and video coding, and more particularly to transcoding images including a region-of-interest subject to bandwidth and buffer constraints.

BACKGROUND OF THE INVENTION

Video surveillance, cellular telephones, digital cameras, printers, scanners, facsimile, copiers, medical imaging, satellite imaging, the Internet, and compound documents have increased the demand for image and video applications. However, due to limited resources such as bandwidth, storage and processors, high quality images are often not possible. The quality of an image depends on the number of pixels in the image and the number of bits that are allocated to each pixel. For example, a 1024×1024 pixel image with 24 bits for each pixel will be a 25 Mb high quality color image, while a 10×10 pixel image with 1 bit per pixel will be a 100 bit low quality black and white 'thumbnail' image.

One solution distinguishes a region-of-interest (ROI) in an image from background regions. More bits are used to encode the ROI than the background regions. By allocating more bits to the ROI than the background regions, the total number of bits used to encode the image can be reduced without decreasing the perceived resolution and quality of the ROI in the encoded image. Fewer bits reduce the required resources.

One ROI encoding method selectively scales up wavelet transformed coefficients for ROIs, Atsumi et al., "Lossy/lossless region-of-interest image coding based on set partitioning in hierarchical trees," IEEE Proceeding of ICIP, October 1998. The ROIs are also transferred at a higher priority. However, depending on the scaling value, the ROIs can appear to blend into the background. Therefore, the decoder also needs shape information to distinguish the ROIs from the background.

The JPEG 2000 standard defines a max-shift method for ROI encoding, ISO/IEC 15444-1, "Information technology-JPEG 2000 image coding system-Part 1: Core coding system," 1$^{st}$ Edition, 2000. The JPEG 2000 standard uses color conversion, quantization, wavelet transform, progressive bit-plane coding, and entropy coding. The encoded images are transferred as a layered stream of packets. With JPEG 2000, the size and quality of the output image is selected during the encoding. The max-shift method separates the ROI from the background by scaling the ROI into non-overlapping bit planes, Skodras et al., "The JPEG 2000 still image compression standard," IEEE Signal Processing Magazine, September 2001, incorporated herein by reference. The scaling value is sufficiently large to ensure that the minimum coefficient associated with the ROI is larger than the maximum coefficient of the background. When the decoder receives the scaling value, the decoder identifies the ROI coefficients by their magnitudes. The max-shift method enables the encoding of ROIs with arbitrary shapes without explicitly transmitting the shape information of the ROI to the decoder. However, max-shift encoding increases overhead due to extra code blocks that are required to define the boundaries of the ROI.

Another method shifts bits on a plane-by-plane basis to adjust for the relative importance of the ROI, Wang et al., "Bitplane-by-bitplane shift (BbBShift)—A suggestion for JPEG 2000 Region of Interest image coding," IEEE Signal Processing Letters, Vol. 9, No. 5, May 2002. However, the BbBShift method is not compatible with the JPEG 2000 standard.

Another method is named a "partial significant bit-planes shift" (PSBShift), Liu et al., "A new JPEG 2000 region-of-interest image coding method: partial significant bitplanes shift," IEEE Signal Processing Letters, Vol. 10, No. 2, February 2003. The PSBShift method tries to sustain a high quality for ROIs. The BbBShift method is also incompatible with JPEG 2000 standard.

All of the above ROI encoding methods use static coding. That is, the ROI is defined during the encoding. That is a problem when the ROI information is only available during decoding, such as when a viewer desires to specify the ROI. That is also a problem if the ROI information is supplied dynamically by an external source as when, for example, an external process, such as object tracking, analyzes the images before the decoding and determines the ROIs.

A dynamic ROI coding method is described by Rosenbaum et al., "Flexible, dynamic and compliant region of interest coding in JPEG 2000," IEEE Proceeding of ICIP, Rochester, N.Y., September 2002. That method handles dynamic ROI information in an interactive environment. That method uses a precinct/layer mechanism, as defined by the JPEG 2000 standard, to arrange the precinct priority in each layer. That method dynamically inserts layers. ROI packets remain in the same layer, while other packets are shifted up one layer. However, dynamic layer insertion requires recoding of the packet header. This requires rate-distortion recalculation, which is an undesirable feature for real-time image transmission applications.

Due to the problems of the prior art encoding methods, it is desired to provide a new encoding mechanism that avoids re-encoding of the packet header, makes the ROI coding flexible and dynamic, and has a low computational complexity. Such a method has been described by Kong et al. in U.S. patent application Ser. No. 11/002,817, "Image Transcoding," filed on Dec. 2, 2004.

The method described by Kong et al., encodes an image sequence and stores it as a JPEG 2000 bitstream, and then the stored images are transcoded in the compressed-domain using a low-complexity adaptation technique that replaces data packets corresponding to higher quality layers with empty packets. In one particular streaming mode, the ROIs are transcoded with higher quality than the background to satisfy network constraints.

One critical issue that is not addressed by Kong et al. is the problem of rate allocation to each frame. One straightforward method, which is referred to as static rate control, allocates an equal amount of rate to each frame based on available channel bandwidth. The obvious drawback of that method is that it is not adaptive to the scene contents. Also, because there is a fixed set of rate points that could be achieved by the transcoder depending on the rate allocated to each quality layer and other transcoding parameters such as output resolution level and ROI, it is very likely that the available bandwidth is not fully utilized.

Therefore, there is a need for a method that improves overall quality over the static rate control method by utilizing more of the available bandwidth, while satisfying buffer constraints and maintaining consistent quality over time.

It is important to distinguish rate control for predictive video coding and transcoding, such as coding and transcoding of typical MPEG bitstreams, versus rate control for image transcoding, e.g., based on JPEG 2000. One key difference is that with predictive coding, a method to estimate the actual rate of the output given the set of output parameters, such as quantization step size, is required. This is difficult due to the prediction dependency between frames as well as the use of variable length coding for coding data symbols. This uncertainty is further complicated when frame skipping is employed. More specifically, when a video coder skips a frame due to high buffer occupancy, it is difficult to estimate, ahead of time, the amount of bits that will be used to code the next frame because the correlation between frames varies and many complicated processes such as motion estimation need to be performed in order to determine the symbols that are actually be coded. This dependency is not present in the transcoding of an encoded image sequence and the use of embedded coding methods allows us to precisely determine the bit rate for different quality settings and when a frame is skipped.

SUMMARY OF THE INVENTION

A rate control method for a streaming video system dynamically transcodes JPEG 2000 frames. The rate control method improves overall quality of the output by increasing bandwidth utilization, while satisfying buffer constraints and maintaining consistent quality over time.

DETAILED DESCRIPTION OF THE PREFERRED EMBODIMENT

Figure 1:
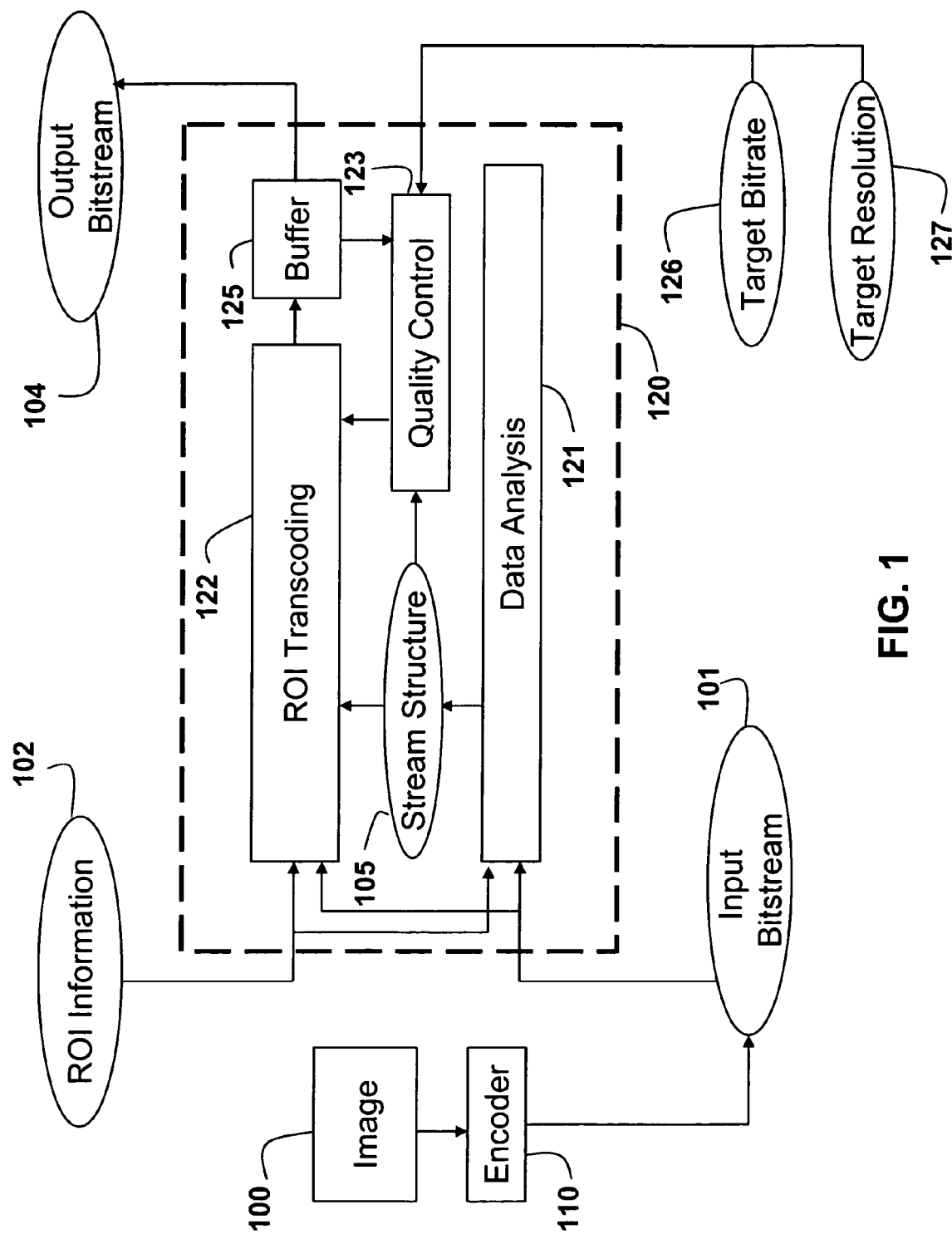
FIG. 1 is a block diagram of a transcoding system with quality control according to an embodiment of the invention.

As shown in FIG. 1, an image 100 is encoded by a standard JPEG 2000 encoder 110 to yield an input bitstream 101. A structure of the input bitstream includes a stream of packets that form one or more quality layers, each quality layer includes one or more resolution levels, each resolution level includes one or more components, each component includes one or more precincts, and each precinct includes a packet partition location, a header length, and a body length.

Typically, the image can include one or more regions of interest superimposed on a background. It is desired to allocate more bits during the transcoding to the ROIs.

The input image sequence is also subject to an object tracking process to yield ROI information 102. The ROI information is specified by a set of coordinates defining a rectangular bounding box surrounding an object in the image 100. In our system, the code stream and resulting ROI information are stored in a memory for subsequent processing.

To satisfy a target bit rate 126 and a target resolution 127, transcoding 120 is performed to yield an output bitstream 104. In the following, we describe three main components of our JPEG 2000 transcoder 120 including data analysis 121, ROI transcoding 122, and quality control 123.

Data Analysis

The data analysis 121 extracts indexing information about a structure 105 of the input bitstream. The analysis unit 121 is essentially a low-complexity parser that identifies and analyzes a packet header for each quality layer, the resolution levels, and the components and precincts. The parser can be characterized as a partial decoder. The stream structure information 105, which includes a byte position, a header length and a body length for each packet, is stored. Because this partial decoding operates on the packet header only without performing full entropy arithmetic decoding for code blocks, the computational complexity is very low. For additional details on extracting the JPEG 2000 stream structure information 105, see U.S. patent application Ser. No. 11/002,817, "Image Transcoding," filed by Kong et al. and incorporated herein by reference.

For the purpose of rate control, it is important to have access to the byte information corresponding to different regions of the image. In the present invention, multiple multi-dimensional arrays are used to store the stream structure information 105. Specifically, a first multi-dimensional array is used to store the stream structure corresponding to the background region of a scene, while a second multi-dimensional array is used to store the stream structure corresponding to the region-of-interest of a scene.

ROI Transcoder

Our ROI transcoder 120 supports reduction of spatial resolution and quality layers. Given a set of coordinates that specify the ROI, we perform ROI transcoding 122 by replacing packets at high quality layers that are associated with the background region scene with empty packets, as defined by the JPEG 2000 standard. This is an effective method for reducing the overall bit rate of the output bitstream, while retaining the quality of important objects and keeping the computational complexity low. The bit rate directly corresponds to the number of packets that are composed for each subset of packets.

The transcoder essentially composes the encoded output bitstream 104 from a subset of packets selected from the encoded input bitstream, according to the structure provided by the analyzing, and uses empty packets to fill in the gaps. The transcoder uses a buffer 125, described in greater detail below, to buffer packets while transcoding.

The output bitstream 104 includes a first set of packets that corresponds to the ROI and a first quality value, and a second set of packets that corresponds to the background region and a second quality value. The empty packets are used to fill the portions of the output bitstream that correspond to the spatial location of the background region up to the first quality value. Generally, the first quality value is greater than the second quality value.

Quality Control

The quality control method according to the invention determines a rate allocation for a current image or frame, based on a target bit rate, buffer occupancy and ROI information. Given the bytes allocated to a frame, the transcoder determines quality layers for background and the ROI. The quality control also determines whether a frame should be skipped and whether to hold the quality from the previous coding instant at a constant level.

Figure 2:
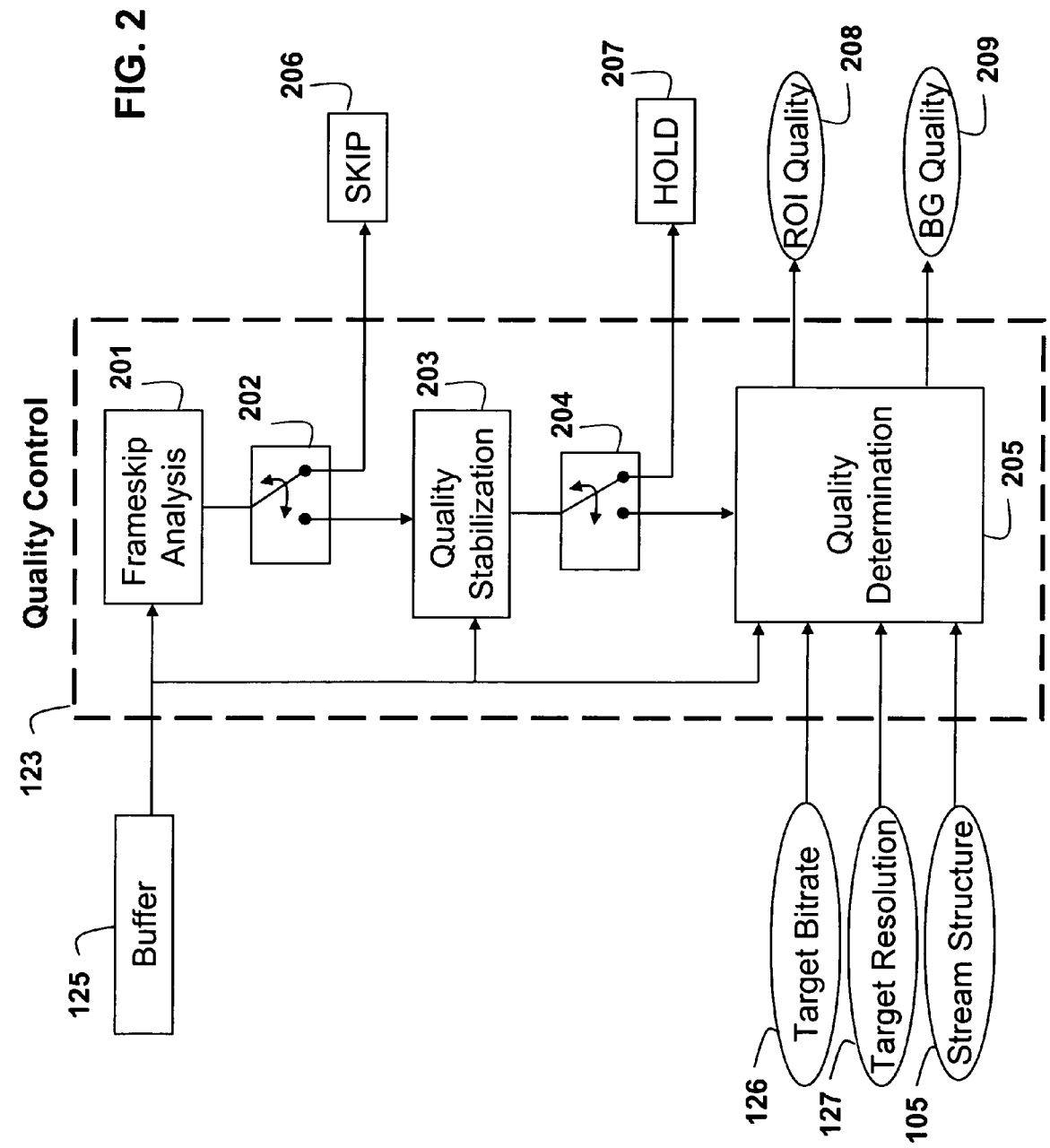
FIG. 2 is a block diagram of a quality control process according to an embodiment of the invention.

As shown in FIG. 2, quality control 123 includes a frame skip analysis 201, quality stabilization 203 and quality determination 205. The frame skip analysis 201 uses the state of the buffer 125 as input and decides 202 if the current frame should be skipped 206 during transcoding 122. If the current frame is not skipped, a quality stabilization method 203 is invoked, which also uses the state of the buffer 125 as input, and decides 204 if the quality of the current frame should hold 207 the quality of the previous frame. If the quality is not held, a new ROI quality 208 and background (BG) quality 209 are computed by quality determination 205 based on the target bitrate 126, target resolution, 127 and stream structure 105.

Quality Determination

In the prior art static rate control method, a fixed number of bits, $T_f=R/F$, is allocated to each image or frame, where R is the target bit rate and F is the output frame rate.

To avoid overshooting the target bit rate, the quality layers in the transcoded output bitstream 104 are selected so as not to exceed the given target bit rate.

The main drawback of the conventional static rate allocation approach is that it typically underutilizes the available bandwidth for a given stream because the quality layers can only provide a discrete set of output bits.

Figure 3:
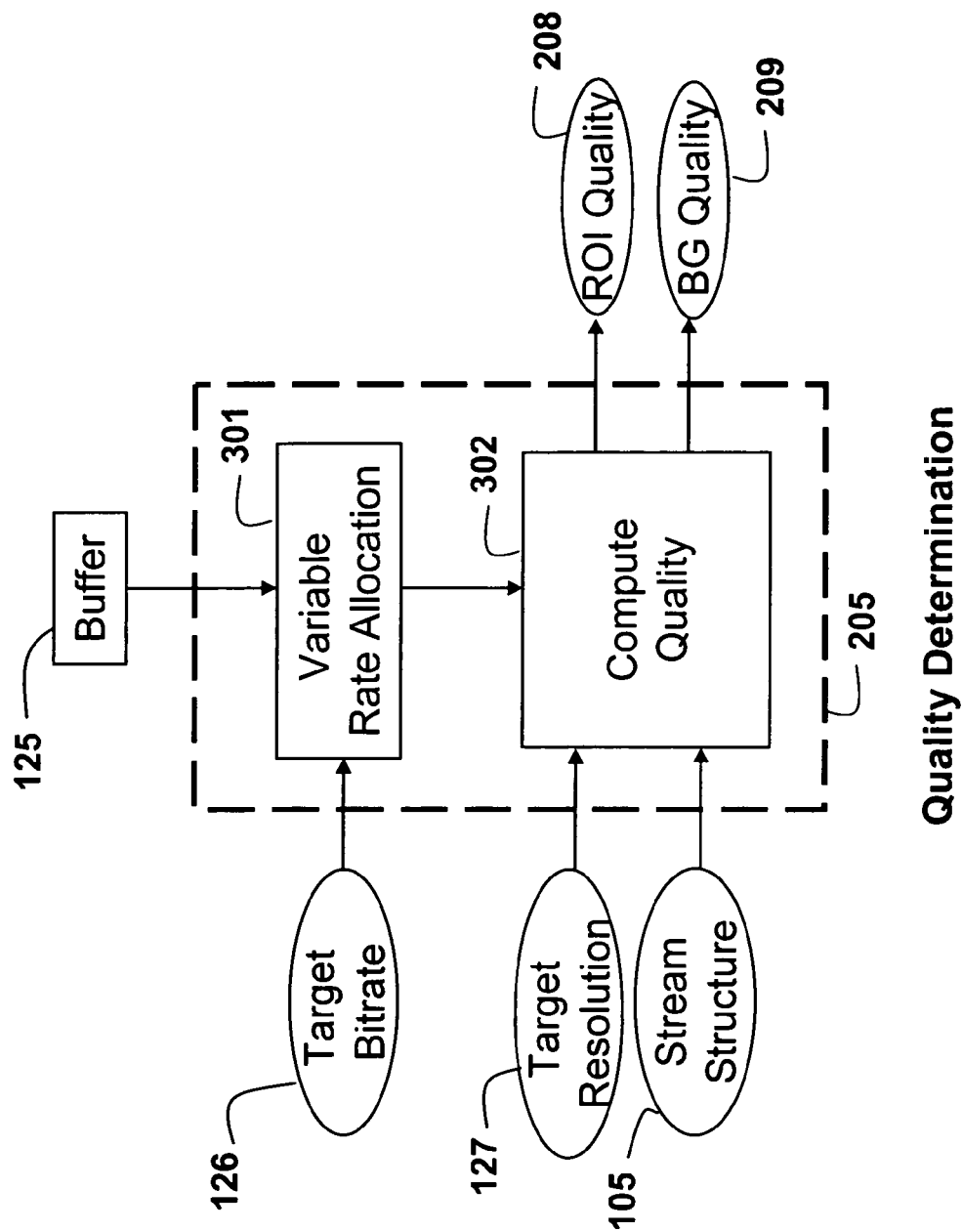
FIG. 3 is a block diagram of a quality determination process of the quality control according to an embodiment of the invention.

In the quality determination process according to an embodiment of the invention as shown in FIG. 3, a variable rate allocation 301 is performed for each frame based on the target bit rate 126 and a state of the buffer 125. The buffer is used to absorb variations in the bit rate allocated to each frame. The rate allocated to each frame is determined according to the following:

$$T_v = T_{max} \cdot \max[0, \min(1, 1-\alpha^2)], \quad (1)$$

where $T_{max}$ sets an upper limit on the variable bit rate assigned to any particular frame and is assigned based on the target bit rate 126. In a preferred embodiment, the value $T_{max}$ is $2T_f$. The value $\alpha$ is a buffer occupancy parameter, which is a function of the buffer occupancy B, the buffer size $B_s$, and a safety margin $\gamma$, with typical values in the range $[0, 0.25]$. The buffer occupancy parameter $\alpha$ is given by $$\alpha = \frac{B}{B_s \cdot (1-\gamma)}. \quad (2)$$

When the buffer occupancy is near an upper margin, the parameter $\alpha$ tends to approach 1, and a lower bit rate is allocated to the current frame. A higher bit rate is allocated to the current frame when the buffer occupancy is near empty, i.e., when $\alpha$ is zero or close to zero.

Given a target bit rate for a frame, the ROI quality 208 and background quality 209 are computed 302 in a systematic manner based on the target resolution 127 and byte counts included in the stream structure 105 provided by the data analysis 121. First, minimum quality values are provided for the background and the ROI. Then, the ROI quality value is successively increased. Finally, additional quality layers are added to the background.

Frame Skip Analysis

Figure 4:
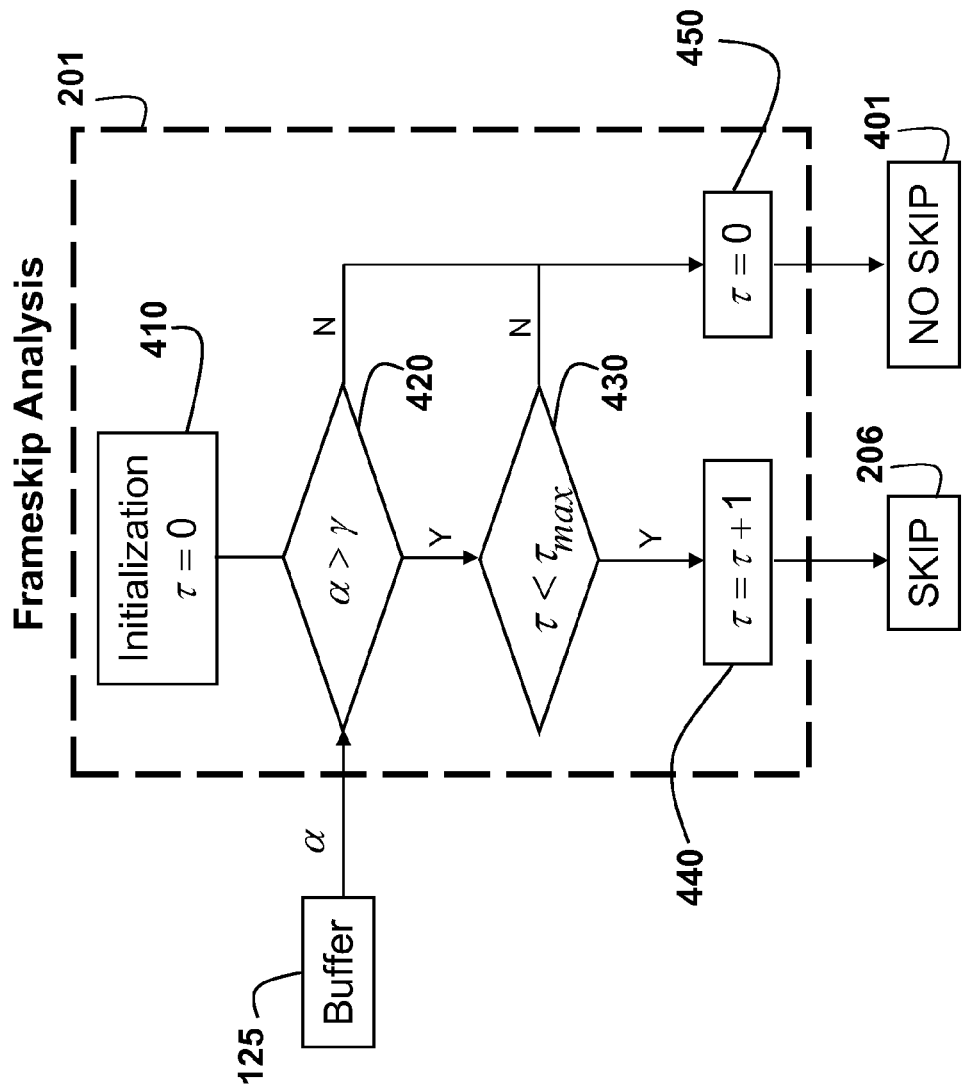
FIG. 4 is a flowchart of a frame skip analysis process of the quality control according to an embodiment of the invention.

When frame skip analysis 201 is enabled, periodic frames, with no ROI defined, may be skipped 206, as shown in FIG. 4. The rationale for this strategy is twofold. First, we aim to empty the buffer when there is no ROI to allow greater bandwidth for future frames that contain ROI. Second, we aim to improve the quality of the non-ROI image, which is possible because we can allocate more bytes to an image sequence with a reduced frame rate.

With this strategy, frames are skipped 206 to drive the buffer level towards its lower margin. When the buffer reaches this level, frames are no longer skipped 401, and because the buffer is nearly empty, these frames are allocated at a bit rate close to $T_{max}$.

Stating the skip condition more precisely, after initialization 410, a frame is skipped when the following condition is true in steps 420 and 430:

$$(\alpha > \gamma) \& (\tau < \tau_{max}) \quad (3)$$

where $\gamma$ is the safety margin, $\tau$ is an interval of successive non-ROI frame skips, and $\tau_{max}$ is the maximum frame skip interval.

The flowchart given in FIG. 4 illustrates the frame skip analysis 201 in detail. Based on the state of the buffer 125, it is determined whether the current frame should be skipped 206 or if the current frame should not be skipped 401 during transcoding 122. If a frame is skipped, then the interval $\tau$ is incremented 440, otherwise the interval is reset 450 to zero.

Quality Stabilization

Figure 5:
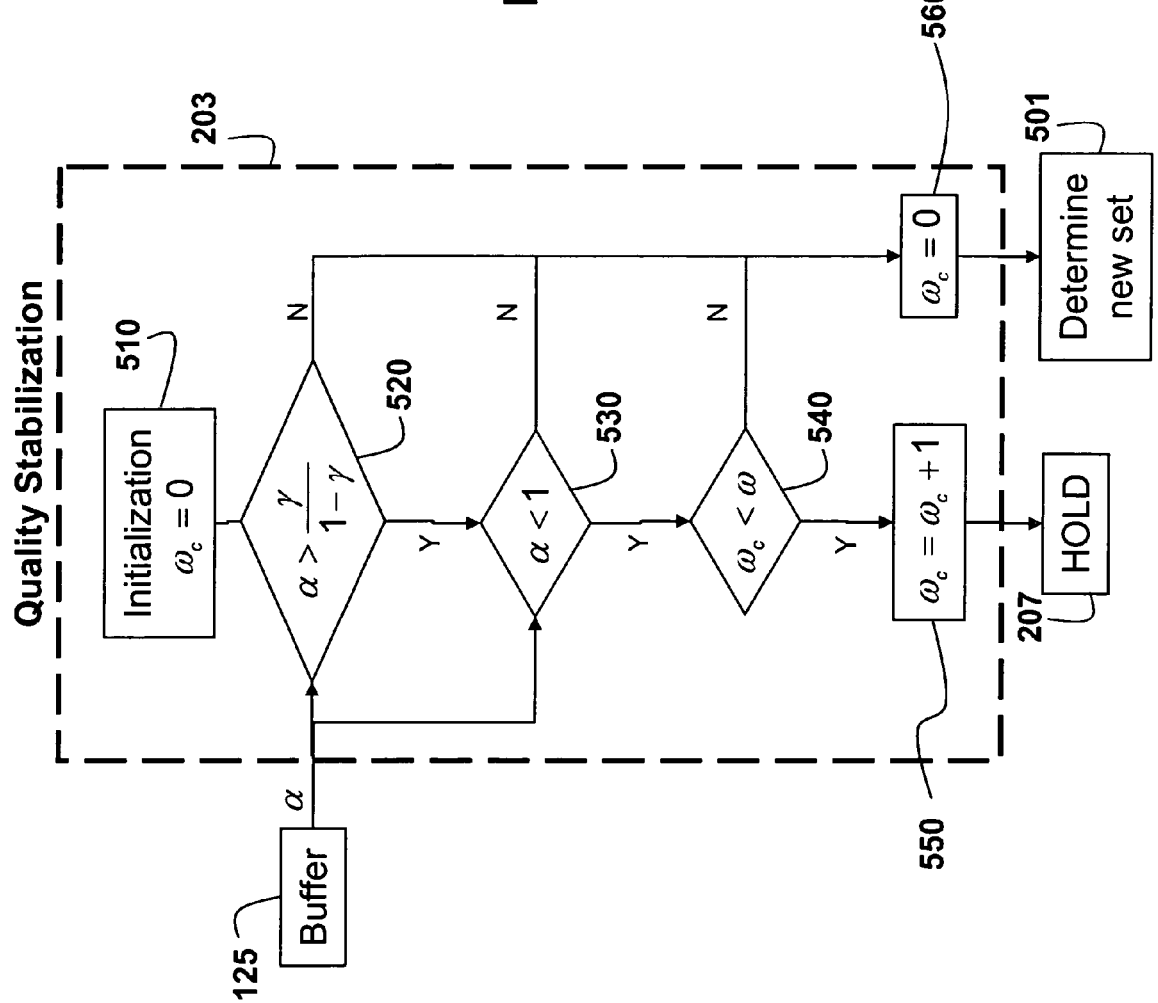
FIG. 5 is a flowchart of a quality stabilization process of the quality control according to an embodiment of the invention.

As shown in FIG. 5, a key objective of the quality stabilization 203 is to establish a period in which the quality levels are stable, thereby avoiding unnecessary oscillation or frequent changes in quality. Depending on the available buffer size, a typical window period, $\omega$, is several frames. The process is initialized in step 510.

Let $Q_p$ denote the set of determined quality layers for the previous frame, $Q_i$ be the set of quality layers for the current frame i with bit rate allocated according to Equation (1), and $\omega_c$ be a window counter that is reset 560 when either the counter reaches the window period or a new set of quality layers for the current frame are determined 501, otherwise it is incremented in step 550.

With quality stabilization enabled, the set of quality layers would be assigned according to:

$$Q = \begin{cases} Q_p & B_s \cdot \gamma < B < B_s \cdot (1-\gamma) \ \& (\omega_c < \omega) \\ Q_i & \text{otherwise.} \end{cases} \quad (4)$$

Given the definition of the occupancy parameter $\alpha$ in Equation (2), we can rewrite Equation (4) as:

$$Q = \begin{cases} Q_p & \left(\frac{\gamma}{1-\gamma} < \alpha < 1\right) \& (\omega_c < \omega) \\ Q_i & \text{otherwise} \end{cases} \quad (5)$$

which is entirely dependent on the buffer occupancy parameter $\alpha$ as well as the safety margin $\gamma$ and window parameters, $\omega_c$ and $\omega$. Steps 520, 530, and 540 implement the equation.

With the above, the previous set of quality layers is used for the current frame when the buffer is not in danger or overflow or underflow and the window counter is less than the window period.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for scalable image transcoding, comprising an encoder for performing steps of the method, comprising the step of:

analyzing an encoded input bitstream of an image to obtain a structure of the encoded input bitstream, in which the image includes a region-of-interest and a background region, and in which the encoded input bitstream is a stream of packets, in which a number of packets in each subset of packets are determined according to an allocated variable bit rate $T_v$, in which the variable bit rate $T_v$ is allocated dynamically based on a target bit rate and a buffer occupancy, and in which the variable bit rate is allocated according to $T_v = T_{max} \cdot \max[0, \min(1, 1-\alpha^2)]$, where $T_{max}$ is an upper limit on the variable bit rate assigned to the image, and $\alpha$ is a buffer occupancy parameter;

determining a first quality value for the region-of-interest and a second quality value for the background region; and composing an encoded output bitstream from a subset of the packets selected from the encoded input bitstream according to the structure, in which the subset of packets includes a first set of packets corresponding to the region-of-interest having the first quality value, a second set of packets corresponding to the background region and having second quality value, and empty packets.

2. The method of claim 1, in which the structure of the encoded input bitstream includes one or more quality layers, and in which each quality layer includes one or more resolution levels, and in which each resolution level includes one or more components, and in which each component includes one or more precincts, and in which each precinct includes a packet partition location, a header length, and a body length.

3. The method of claim 2, in which the analyzing identifies and analyzes a packet header of each quality layer, the resolution levels, the component and the precincts.

4. The method of claim 1, in which the structure is stored in a memory.

5. The method of claim 1, further comprising:
decoding partially the encoded input bitstream to perform the analyzing.

6. The method of claim 1, in which the first quality value is greater then the second quality value.

7. The method of claim 1, in which $\alpha$ is function of a buffer occupancy B, a buffer size $B_s$, and a safety margin $\gamma$ with typical values in a range [0, 0.25], and $$\alpha = \frac{B}{B_s \cdot (1-\gamma)}.$$

8. The method of claim 1, in which $T_{max}$ is 2R/F, where R is a target bit rate and F is an output frame rate.

9. The method of claim 1, in which the encoded input bit stream is of a sequence of images, and images without any regions of interest are skipped during the composing.

10. The method of claim 9, further comprising:
stabilizing a quality of the encoded output bitstream.

11. An apparatus for scalable image transcoding, comprising:

means for analyzing an encoded input bitstream of an image to obtain a structure of the encoded input bitstream, in which the image includes a region-of-interest and a background region, and in which the encoded input bitstream is a stream of packets, in which a number of packets in each subset of packets are determined according to an allocated variable bit rate $T_v$, in which the variable bit rate $T_v$ is allocated dynamically based on a target bit rate and a buffer occupancy, and in which the variable bit rate is allocated according to $T_v = T_{max} \cdot \max[0, \min(1, 1-\alpha^2)]$, where $T_{max}$ is an upper limit on the variable bit rate assigned to the image, and $\alpha$ is a buffer occupancy parameter;

means for determining a first quality value for the region-of-interest and a second quality value for the background region; and means for composing an encoded output bitstream from a subset of the packets selected from the encoded input bitstream according to the structure, in which the subset of packets includes a first set of packets corresponding to the region-of-interest having the first quality value, a second set of packets corresponding to the background region and having second quality value, and empty packets.

* * * * *